United States Patent
Zafman et al.

(10) Patent No.: US 11,307,781 B2
(45) Date of Patent: Apr. 19, 2022

(54) MANAGING REPLICAS OF CONTENT IN STORAGE SYSTEMS

(71) Applicant: Red Hat, Inc., Raleigh, NC (US)

(72) Inventors: David Zafman, Beverly Hills, CA (US); Brett Niver, Grafton, MA (US); Neha Ojha, Los Gatos, CA (US); Joshua Durgin, Glendale, CA (US); Adam Kupczyk, Tulce (PL)

(73) Assignee: Red Hat, Inc., Raleigh, NC (US)

( * ) Notice: Subject to any disclaimer, the term of this patent is extended or adjusted under 35 U.S.C. 154(b) by 9 days.

(21) Appl. No.: 16/720,661

(22) Filed: Dec. 19, 2019

(65) Prior Publication Data

US 2021/0191634 A1 Jun. 24, 2021

(51) Int. Cl.
*G06F 3/06* (2006.01)
*G06N 20/00* (2019.01)

(52) U.S. Cl.
CPC ............ *G06F 3/0632* (2013.01); *G06F 3/061* (2013.01); *G06F 3/065* (2013.01); *G06F 3/0659* (2013.01); *G06F 3/0673* (2013.01); *G06N 20/00* (2019.01)

(58) Field of Classification Search
CPC .... G06F 3/0659; G06F 3/0604; G06F 3/0673; G06F 3/0632; G06F 3/061; G06F 3/065; G06F 3/0619; G06F 3/067; G06F 3/0653; G06N 20/00
See application file for complete search history.

(56) References Cited

U.S. PATENT DOCUMENTS

| | | | |
|---|---|---|---|
| 7,890,632 B2 | 2/2011 | Hazlewood et al. | |
| 10,043,026 B1 | 8/2018 | Salour et al. | |
| 10,440,039 B1 | 10/2019 | Salour et al. | |
| 2005/0154697 A1* | 7/2005 | Altaf | G06F 16/27 |
| 2015/0052526 A1* | 2/2015 | Fujiwaka | G06F 9/45533 718/1 |
| 2016/0036909 A1* | 2/2016 | Joshi | H04L 67/1097 709/217 |
| 2016/0203202 A1 | 7/2016 | Merriman et al. | |
| 2017/0153819 A1* | 6/2017 | Zeng | G06F 11/2094 |
| 2019/0310952 A1 | 10/2019 | Wilkinson et al. | |

FOREIGN PATENT DOCUMENTS

CN 101809558 2/2012

OTHER PUBLICATIONS

Amjad, Tehmina, et al., A survey of dynamic replication strategies for improving data availability in data grids, Future Generation Computer Systems 28 (2012) pp. 337-349 (Year: 2012).*

Lu et al., "SCAR: Strong Consistency using Asynchronous Replication with Minimal Coordination", retrieved from https://arxiv.org/abs/1903.00424, cited as arXiv:1903.00424v1,, Mar. 1, 2019, 16 pages.

* cited by examiner

*Primary Examiner* — Prasith Thammavong
*Assistant Examiner* — Edmund H Kwong
(74) *Attorney, Agent, or Firm* — Kilpatrick Townsend & Stockton LLP

(57) ABSTRACT

Replicas of content can be managed in storage systems. In one example, a storage system can determine an amount of load on the storage system based on values for performance metrics indicating a performance of the storage system. Next, the storage system can determine that the storage system is to have a target number of replicas of content based on the amount of load on the storage system. The storage system can then adjust itself to have the target number of replicas of the content.

20 Claims, 4 Drawing Sheets

MANAGING REPLICAS OF CONTENT IN STORAGE SYSTEMS

TECHNICAL FIELD

The present disclosure relates generally to storage systems. More specifically, but not by way of limitation, this disclosure relates to managing replicas of content in storage systems.

BACKGROUND

There are many types of storage systems for storing content, such as objects, blocks, or files. One popular type of storage system is a distributed storage system. Distributed storage systems are computer clusters that include multiple storage nodes for storing content. Typically, distributed storage systems store content in a primary storage node and then store duplicates of the content, called "replicas," in secondary storage nodes to prevent loss of the content if one or more of the nodes fail. For example, a distributed storage system may store an object on a primary storage node and two replicas of the object on secondary storage nodes to provide redundancy, so that if the primary storage node fails the replicas of the object can still be retrieved from the secondary storage nodes. And if one of the secondary storage nodes also fails, a replica can still be retrieved from the other storage node. The more replicas that a storage system creates for a given piece of content, the more "durable" the storage system is against such failures.

DETAILED DESCRIPTION

Figure 1:
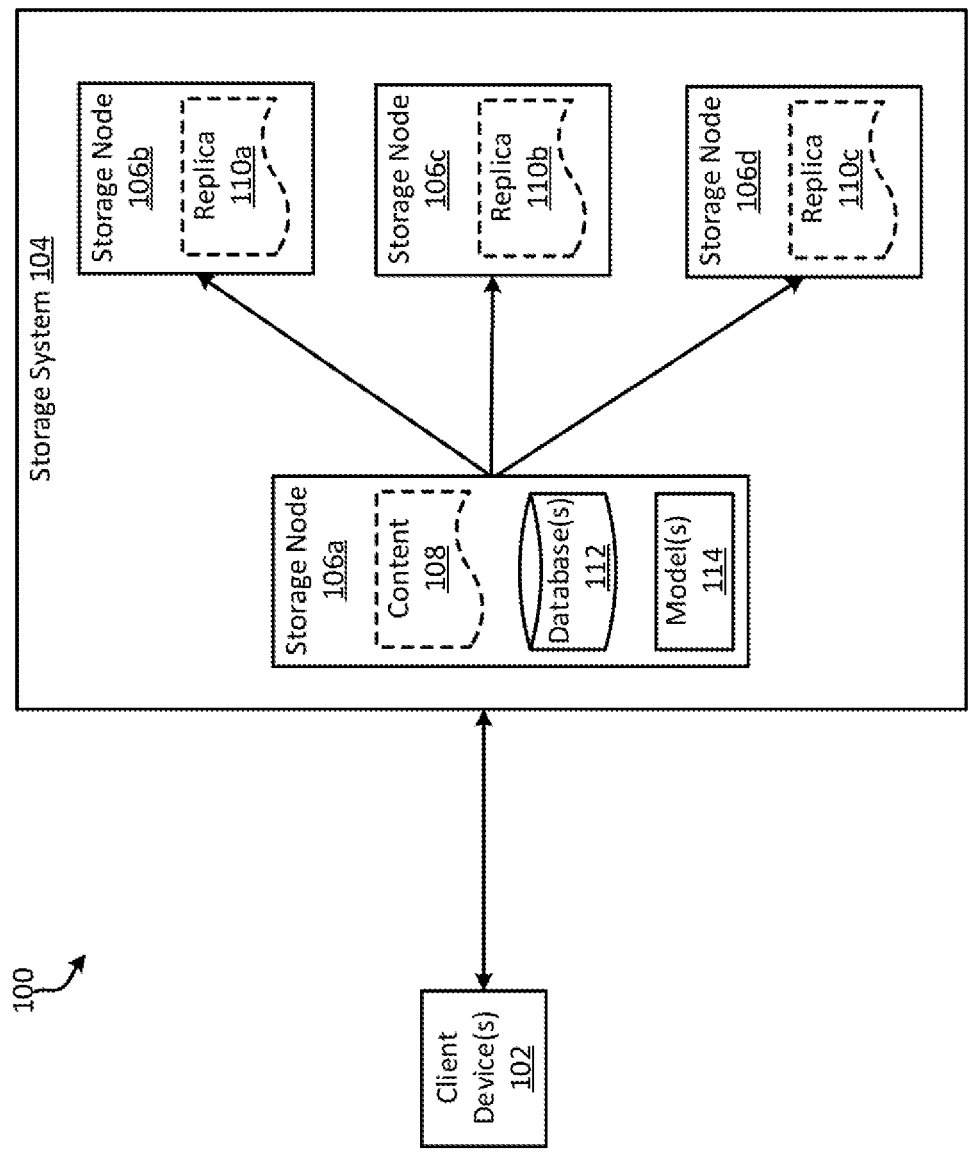
FIG. 1 is a block diagram of an example of a system for managing replicas of content according to some aspects of the present disclosure.

Storage systems typically create a fixed number of replicas for each piece of content and store the replicas in multiple locations (e.g., storage nodes) to prevent data loss if the storage system fails. That fixed number is generally a static value that is either chosen beforehand by a system administrator or set as a default. For example, a system administrator may determine that their storage system should create three replicas for each piece of content and configure the storage system accordingly. In determining how many replicas to create, system administrators must balance the durability of the storage system against performance concerns, like latency and resource consumption, since it takes time and computing resources (e.g., processing power and memory) to create each replica. Given this tradeoff, it can be challenging for system administrators to select the right number of replicas that strikes a suitable balance between durability and performance. This becomes even more challenging in the context of larger and more-variable storage systems, which may dynamically change in topology for scaling reasons and may have highly variable loads depending on a variety of factors, such as the time of day.

Some aspects and features of the present disclosure can overcome one or more of the abovementioned issues by dynamically adjusting the number of replicas for a piece of content based on the load of the storage system. The load can be the amount of computational work being performed by the storage system. The number of replicas can be dynamically adjusted such that more replicas are created when there is less load, and fewer replicas are created when there is more load. As a result, the storage system can have higher durability when there is less load, and the storage system can have better performance (e.g., less latency and resource consumption) when there is more load. In this way, the storage system can adjust itself to strike the proper balance between durability and performance based on load conditions.

As one particular example, a storage system of the present disclosure can determine an amount of load on the storage system based on one or more values of one or more performance metrics indicating the performance of the storage system. Examples of the performance metrics can include a load average, a queue depth, and a tail latency associated with the storage system. Based on the amount of load, the storage system can determine a target number of replicas for content. For example, the storage system may select a lower target-number if the load is higher to conserve computing resources and reduce latency. Conversely, the storage system may select a higher target-number if the load is lower to improve the durability of the storage system. The storage system can then adjust itself (e.g., add or remove replicas) to have the target number of replicas of the content.

The above process can be repeated periodically to dynamically adjust the number of replicas in the storage system depending on the amount of load on the storage system. For example, the storage system can repeated at predefined intervals during a timespan to dynamically adjust how many replicas of content are stored in the storage system over the timespan, based on the amount of load on the storage system at different points in time during the timespan.

Some examples of the present disclosure can additionally or alternatively determine how the replicas are to be updated—e.g., synchronously or asynchronously—based on the performance metrics or the load on the storage system. Asynchronous replication involves updating the replicas for a piece of content asynchronously over a time period after receiving a write request, so that all of the replicas are "eventually" consistent with one another. Asynchronous replication can introduce less latency into the storage system than synchronous replication, which involves updating all of the replicas synchronously so that they are all "immediately" consistent with one another. But asynchronous replication can also decrease the durability of the storage system. This is because if the storage system fails in the intervening time period before all of the replicas are updated, there are fewer up-to-date replicas from which to pull data. So, there are tradeoffs between performance and durability. Some examples of the present disclosure can find a balance between these tradeoffs by dynamically adjusting whether replicas are to be updated synchronously, asynchronously, or both (e.g., updating some replicas synchronously and others asynchronously), depending on the performance of the storage system.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for managing replicas 110a-c of content 108 according to some aspects of the present disclosure. The system 100 includes one or more client device(s) 102, such as laptop computers, desktop computers, or mobile devices. The client devices 102 can communicate with a storage system 104 over a network, such as a local area network (LAN), a wide area network (WAN), or the Internet. For example, the client devices 102 can transmit read requests and write requests to the storage system 104 for reading content from and writing content to the storage system 104, respectively.

In the example shown in FIG. 1, the storage system 104 is a distributed storage system. One example of a distributed storage system is an object-storage system that uses the Ceph platform by Red Hat®. The storage system 100 includes a group of storage nodes 106a-d (e.g., storage servers) for storing data. Each of the storage nodes 106a-d can include one or more memory devices, such as hard drives.

The storage system 104 can receive read and write requests from the client device 102 and distribute them among the storage nodes 106a-d, which can service those requests. The storage system 104 may determine how to distribute the read and write requests among the storage nodes 106a-d based on the load on the storage system 104 or other factors, such as if one or more of the storage nodes 106a-d has failed. For example, the storage system 104 can receive a read request from the client device 102, determine that the storage nodes 106a-c have failed, and thus distribute the read request to storage node 106d, since the storage node 106d is the only remaining storage node that is operational.

For each piece of content stored in the storage system 104, there will generally be a primary storage node on which the piece of content is primarily stored and secondary storage nodes that store replicas of the piece of content. One example of this arrangement is depicted in FIG. 1, which depicts content 108 stored on storage node 106a and replicas 108a-c of the content 108 stored on storage nodes 106b-d. In this arrangement, storage node 106a serves as the primary storage node and storage nodes 106b-d serve as the secondary storage nodes. But each of the storage nodes 106a-d can serve as both a primary storage node for some content and a secondary storage node for other content. For example, storage node 106c can serve as a primary storage node for another piece of content (not shown) and storage node 106a can serve as a secondary storage node for that piece of content, in which case the storage node 106a can include a replica of that piece of content.

In some examples, the storage system 104 can dynamically adjust the amount of replicas of some or all of the content in the storage system 104 based on the values of performance metrics. This process may begin with the storage system 104 (e.g., storage node 106a) selecting which performance metric(s) to use. One example of a performance metric can include a load average, where the load average is the average amount of load over a predefined timespan. Another example of a performance metric can include a queue depth, which can include the number of pending read or write requests from client devices 102. The queue depth can additionally or alternatively include the number of requests related to internal background work of the storage system 104, such as garbage collection, scrubbing, or recovery. Another example of a performance metric can include a tail latency, which is an unusually long delay when reading or writing data that falls in the "tail" of a latency distribution curve. Yet another example of a performance metric is a background processing level, which is the level of background processing going on for purposes other than servicing read and write requests from client devices. Other performance metrics are also contemplated within the scope of this disclosure.

To select the performance metrics, the storage system 104 can log values for a group of candidate performance metrics over a predefined timespan, such as one week. The storage system 104 can also log the load on the storage system 104 over the same timespan. The storage system 104 can then determine relationships between the candidate performance metrics and the load. For example, the storage system 104 can perform a regression analysis in which the performance metrics serve as the independent variables and the storage-system load serves as the dependent variable, to determine the relationships between the candidate performance metrics and the load. Some of the candidate performance metrics have a greater influence on the load than others. In some examples, the storage system 104 may select a predefined number (e.g., two) of the candidate performance metrics that have the largest influence on the load for subsequent use. In this way, the storage system 104 can automatically select the most relevant performance metrics.

After the performance metric(s) have been selected, the storage system 104 can then use them to determine an amount of load on the storage system 104. For example, the storage system 104 can determine values for the performance metrics with respect to one or more individual storage nodes 106a-d or with respect to the storage system 104 as a whole, and use those values to determine the load on the storage system 104. In one such example, the storage system 104 may determine that there is a high amount of load on the storage system 104 if there is a high load average, queue depth, tail latency, background processing level, or any combination of these. And the storage system 104 may determine that there is a low amount of load on the storage system 104 if there is a low load average, queue depth, tail latency, background processing level, or any combination of these. In some examples, the storage system 104 can rely on one or more databases 112 for correlating one or more values for performance metrics to load amounts. The database(s) 112 may be generated ahead of time by a third party like Red Hat®. Alternatively, the storage system 104 can rely on one or more predefined equations for correlating one or more values for performance metrics to load amounts.

The storage system 104 can next determine a target number of replicas for one or more pieces of content, such as content 108, based on the amount of load on the storage system 104. For example, the storage system 104 may select a lower target-number if the load is higher, which may improve the performance of the storage system 104. Conversely, the storage system 104 may select a higher target-number if the load is lower, which may improve the durability of the storage system 104. In some examples, the storage system 104 can determine the target number of replicas based on predetermined relationships in a database 112, where the predetermined relationships include load amounts correlated to target numbers of replicas. Alternatively, the storage system 104 can determine the target number of replicas using one or more models 114, as detailed below.

In one example, the storage system 104 can include one or more models 114, which may be generated or trained ahead of time by a third party like Red Hat®. At least one of the models 114 can be configured to determine a target number of replicas based on an amount of load on the storage system 104. The model 114 may be a machine-learning model, such as a neural network or classifier. In some such examples, the model can be trained using a training dataset that includes input-output pairs, where each of the input-output pairs includes a respective load amount as input and a corresponding target number of replicas as output. The training dataset can include dozens or hundreds of such input-output pairs, from which the machine-learning model can be trained. Once trained, the machine-learning model can be used to determine the target number of replicas for a given load amount. For example, the storage system 104 can supply the load amount as input to the machine-learning model and receive the target number of replicas as output from the machine-learning model.

In an alternative example, the storage system 104 may skip the step of determining the amount of load on the storage system 104. In such an example, the model 114 may include a machine-learning model that is trained using input-output pairs, where each input-output pair includes a respective set of performance-metric values as input and a corresponding target number of replicas as output. One example of an input-output pair may include the input value set {0.8, 1.1, 1.6, 0.3} and the output value 2, where {0.8, 1.1, 1.6, 0.3} are values for four performance metrics and 2 is a target number of replicas to be provided as output. The training dataset can include hundreds or thousands of such input-output pairs, from which the machine-learning model can be trained. Once trained, the machine-learning model can be used to determine the target number of replicas for a given set of performance-metric values. For example, the storage system 104 can supply the values for the performance metrics as inputs to the machine-learning model and receive the target number of replicas as output from the machine-learning model.

Either way, the storage system 104 can determine the target number of replicas for the content 108 and adjust itself so as to have the target number of replicas. For example, the storage system 104 can determine that it currently has three replicas 110a-c of the content 108, and that the target number of replicas of the content 108 is four. So, the storage system 104 can determine that the difference between the current number of replicas for the content 108 and the target number of replicas is one. Based on this difference, the storage system 104 can add one more replica of the content 108, e.g., on another storage node not shown in FIG. 1. As another example, the storage system 104 can determine that it currently has three replicas 110a-c of the content 108, and that the target number of replicas of the content 108 is one. So, the storage system 104 can determine that the difference between the current number of replicas for the content 108 and the target number of replicas is two. Based on this difference, the storage system 104 can delete two replicas of the content 108, e.g., from storage nodes 106c-d.

After generating the target number of replicas 110a-c in the storage system 104, the storage system 104 may receive a write request associated with the content 108 from the client devices 102. In some examples, the storage system 104 can respond to such write requests by updating the replicas 110a-c using asynchronous replication, synchronous replication, or both. Updating replicas asynchronously may introduce less latency than synchronous replication. However, updating replicas asynchronously may also decrease the durability of the storage system 104, because if the storage system 104 fails in the intervening time period before all of the replicas 110a-c are updated, there are fewer up-to-date replicas from which to pull data. Thus, there is a tradeoff between performance and durability. Some examples can attempt to strike a balance between durability and performance by updating replicas synchronously, asynchronously, or a combination thereof, based on the values of the performance metrics or the amount of load on the storage system 104.

Figure 2:
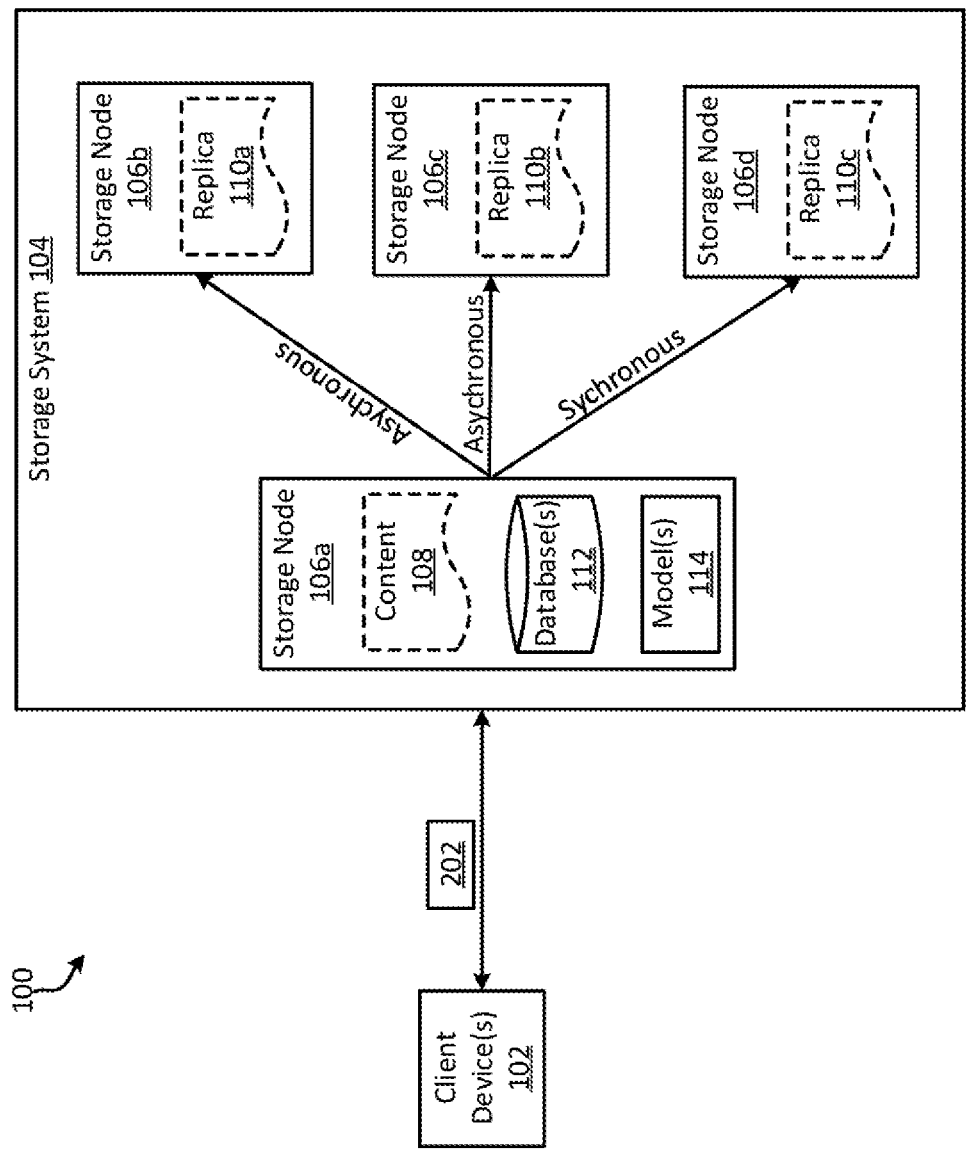
FIG. 2 is a block diagram of an example involving updating replicas in response to write requests according to some aspects of the present disclosure.

One such example is shown in FIG. 2. In FIG. 2, the storage system 104 has received a write request 202 associated with the content 108 from the client devices 102. The storage system 104 can respond to the write request 202 by updating the replicas 110a-c using asynchronous replication, synchronous replication, or both. For example, as shown in FIG. 2, the storage system 104 can determine that replicas 110a-b are to be updated using asynchronous replication and that replica 110c is to be updated using synchronous replication, and then update the replicas 110a-c accordingly.

In some examples, the storage system 104 can determine that some or all of the replicas should be updated synchronously if the load is lower, which may improve the durability of the storage system 104. Conversely, the storage system 104 can determine that some or all of the replicas should be updated asynchronously if the load is higher, which may improve the performance of the storage system 104. And in some examples, the storage system 104 can determine that some of the replicas should be updated synchronously and other replicas should be updated asynchronously, to strike a balance between durability and performance. The storage system 104 can then update the replicas in accordance with the determined approach(es). In this way, the storage system 104 can have a sliding scale in which all of the replicas are updated synchronously at one end of the scale, all of the replicas are updated asynchronously at the other end of the scale, and a mix occurs in-between.

In some examples, the storage system 104 can determine that a particular number of replicas are to be updated synchronously or asynchronously using a database 112. The database 112 may include relationships between (i) load amounts on the storage system 104 and (ii) indications of how many replicas are to be updated using synchronous or asynchronous replication. For example, the database 112 can specify that load amounts above 50% result in 75% of the replicas being updated asynchronously, and load amounts above 70% result in 100% of replicas being updated asynchronously. For each of these, the remainder of the replicas would be updated synchronously. In alternative examples, the storage system 104 can determine that a particular number of the replicas are to be updated synchronously or asynchronously using an algorithm. One example of such an algorithm can include a proportional relationship between the amount of load on the storage system 104 and the number of replicas to be updated synchronously or asynchronously. For instance, a load of 50% on the storage system 104 can result in 50% of the replicas being updated asynchronously, a load of 70% on the storage system 104 can result in 70% of the replicas being updated asynchronously, and a load of 90% on the storage system 104 can result in 90% of the replicas being updated asynchronously. For each of these, the remainder of the replicas would be updated synchronously.

In some examples, the storage system 104 can determine that a particular number of the replicas are to be updated synchronously or asynchronously using a model 114, such as a machine-learning model. In some such examples, the model can be trained using a training dataset that includes input-output pairs, where each of the input-output pairs can include a respective set of performance-metric values and a corresponding number of replicas to update asynchronously (or synchronously) as output. Alternatively, each of the input-output pairs can include a respective load amount as input and a corresponding number of replicas to update asynchronously (or synchronously) as output. Either way, the training dataset can include dozens or hundreds of such input-output pairs, from which the machine-learning model can be trained. Once trained, the machine-learning model can be used to determine how many of the replicas to update asynchronously (or synchronously). For example, the storage system 104 can supply a set of performance-metric values or a load amount as input to the machine-learning model, and receive a particular number of replicas to update asynchronously as output from the machine-learning model. The storage system 104 can then update the particular number of replicas asynchronously, with a remainder of the replicas being updated synchronously.

While FIGS. 1-2 depict the system 100 as including a certain number and arrangement of components, this is not intended to be limiting. Other examples can include more components, fewer components, different components, or a different arrangement of the components shown in FIGS. 1-2. For example, although FIGS. 1-2 depict the database(s) 112 and the model(s) 114 as being located on storage node 106a, in other examples these components may be located in any suitable location within the storage system 104.

Figure 3:
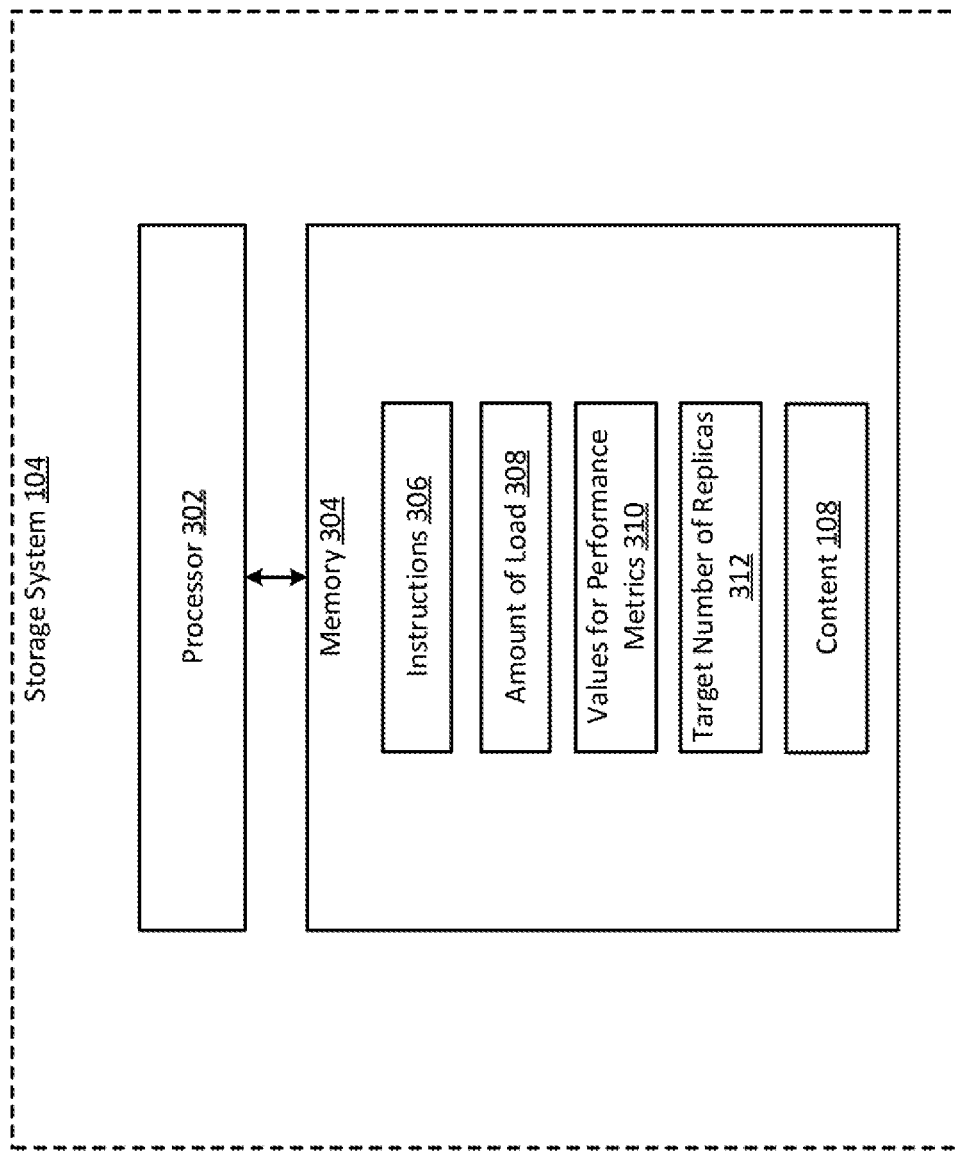
FIG. 3 is a block diagram of an example of a storage system for managing replicas of content according to some aspects of the present disclosure.

FIG. 3 is a block diagram of an example of a storage system 104 for managing replicas of content 108 according to some aspects of the present disclosure. The components depicted in FIG. 3 can be included in one or more storage nodes or otherwise included in the storage system 104.

The storage system 104 includes a processor 302 communicatively coupled to a memory 304. The processor 302 can include one processor or multiple processors. Non-limiting examples of the processor 302 include a Field-Programmable Gate Array (FPGA), an application-specific integrated circuit (ASIC), a microprocessor, etc. The processor 302 can execute instructions 306 stored in the memory 304 to perform operations. In some examples, the instructions 306 can include processor-specific instructions generated by a compiler or an interpreter from code written in any suitable computer-programming language, such as C, C++, C #, etc.

The memory 304 can include one memory device or multiple memory devices. The memory 304 can be non-volatile and may include any type of memory device that retains stored information when powered off. Non-limiting examples of the memory 304 include electrically erasable and programmable read-only memory (EEPROM), flash memory, or any other type of non-volatile memory. At least some of the memory device includes a non-transitory computer-readable medium from which the processor 302 can read instructions 306. A non-transitory computer-readable medium can include electronic, optical, magnetic, or other storage devices capable of providing the processor 302 with the instructions 306 or other program code. Non-limiting examples of a non-transitory computer-readable medium include magnetic disk(s), memory chip(s), ROM, random-access memory (RAM), an ASIC, a configured processor, optical storage, or any other medium from which a computer processor can read the instructions 306.

In some examples, the processor 302 can determine an amount of load 308 on the storage system 104 based on values for performance metrics 310 indicating a performance of the storage system 104. The processor 302 can next determine that the storage system 104 is to have a target number of replicas 312 of content 108 based on the amount of load 308 on the storage system 104. The processor 302 can then adjust the storage system 104 to have the target number of replicas 312 of the content 108. The processor 302 may repeat this process at a periodic interval, such as every minute, hour, or day, so as to dynamically optimize performance and durability depending on the circumstances.

Figure 4:
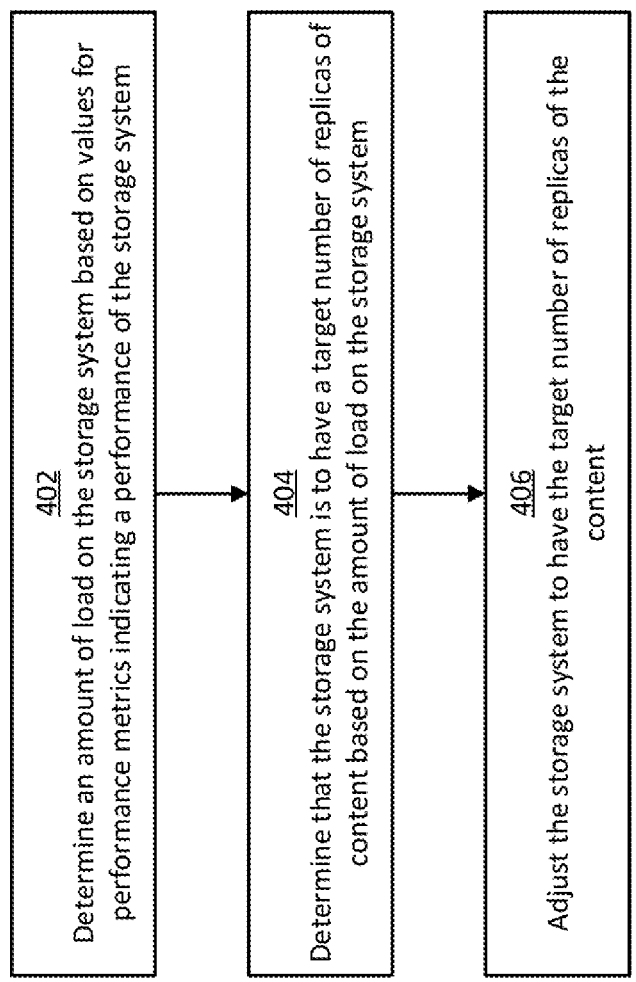
FIG. 4 is a flow chart of an example of a process for managing replicas of content according to some aspects of the present disclosure.

FIG. 4 is a flow chart of another example of a process for managing replicas of content according to some aspects of the present disclosure. While FIG. 4 depicts a certain sequence of steps for illustrative purposes, other examples can involve more steps, fewer steps, different steps, or a different order of the steps depicted in FIG. 4. The steps of FIG. 4 are described below with reference to components of FIG. 3.

In block 402, the processor 302 determines an amount of load 308 on the storage system 104 based on values for performance metrics 310 indicating a performance of the storage system 104. For example, the processor can determine that the load level for the storage system 104 is 72.6% based on the values for the performance metrics 310.

In block 404, the processor 302 determines that the storage system 104 is to have a target number of replicas 312 of content 108 based on the amount of load 308 on the storage system 104. For example, the processor 302 can input the amount of load 308 into an equation or model (such as model 114 of FIGS. 1-2) to determine the target number of replicas 312.

In block 406, the processor 302 adjusts the storage system 104 to have the target number of replicas 312 of the content 108. For example, if the target number of replicas 312 is higher than the current number of replicas of the content 108, then the storage system 104 can add additional replicas of the content 108 to the storage system 104. Conversely, if the target number of replicas 312 is lower than the current number of replicas of the content 108, then the storage system 104 can remove (e.g., delete) excess replicas of the content 108 from the storage system 104.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:
1. A storage system comprising:
a processor; and
a memory including instructions executable by the processor for causing the processor to:
  determine a group of candidate performance metrics;
  determine relationships between the group of candidate performance metrics and storage-system load by performing a regression analysis in which the group of candidate performance metrics serve as independent variables and the storage-system load serves as a dependent variable, wherein the relationships indicate that a first performance metric in the group of candidate performance metrics has a greater influence on the storage-system load than a second performance metric in the group of candidate performance metrics;

select, based on the relationships, the first performance metric from among the group of candidate performance metrics for use in determining an amount of load on the storage system;

determine the amount of load on the storage system based on a value for the first performance metric indicating a performance of the storage system;

determine, based on the amount of load on the storage system, a numerical value representing a total number of replicas of content that are to be present in the storage system; and adjust the storage system to have the total number of replicas of the content.

2. The storage system of claim 1, wherein the memory further includes instructions executable by the processor for causing the processor to adjust the storage system to have the total number of replicas by adding a particular number of replicas of the content to the storage system, the particular number of replicas being equal to a difference between a current number of replicas of the content in the storage system and the total number of replicas of the content, the total number of replicas being more than the current number of replicas.

3. The storage system of claim 1, wherein the memory further includes instructions executable by the processor for causing the processor to:

receive a write request for updating the content;

in response to receiving the write request:

determine that a group of replicas of the content in the storage system is to be updated asynchronously based on the amount of load on the storage system; and update the group of replicas in the storage system asynchronously.

4. The storage system of claim 3, wherein the group of replicas is a first group of replicas, and wherein the memory further includes instructions executable by the processor for causing the processor to, in response to receiving the write request:

determine that a second group of replicas of the content in the storage system is to be updated synchronously based on the amount of load on the storage system, the second group of replicas being different from the first group of replicas; and update the second group of replicas in the storage system synchronously.

5. The storage system of claim 1, wherein the memory further includes instructions executable by the processor for causing the processor to adjust the storage system to have the total number of replicas by removing a particular number of replicas of the content from the storage system, the particular number of replicas being equal to a difference between a current number of replicas of the content in the storage system and the total number of replicas of the content, the total number of replicas being less than the current number of replicas.

6. The storage system of claim 1, wherein the first performance metric includes a load average associated with the storage system, a queue depth associated with the storage system, a tail latency associated with the storage system, or an amount of background activity associated with the storage system.

7. The storage system of claim 1, wherein the memory further includes instructions executable by the processor for causing the processor to repeatedly and dynamically adjust how many replicas of the content are stored in the storage system over a timespan based on values for the first performance metric at different points in time during the timespan.

8. The storage system of claim 1, wherein the memory further includes instructions executable by the processor for causing the processor to determine the total number of replicas by supplying the amount of load as input to a machine-learning model and receiving the total number of replicas as output from the machine-learning model.

9. The storage system of claim 8, wherein the machine-learning model is trained using a training dataset comprising input-output pairs, each of the input-output pairs including (i) a respective load amount as input and (ii) a corresponding target number of replicas as output.

10. A method comprising:

determining, by a processor, a group of candidate performance metrics;

determining, by the processor, relationships between the group of candidate performance metrics and storage-system load by performing a regression analysis in which the group of candidate performance metrics serve as independent variables and the storage-system load serves as a dependent variable, wherein the relationships indicate that a first performance metric in the group of candidate performance metrics has a greater influence on the storage-system load than a second performance metric in the group of candidate performance metrics;

selecting, by the processor and based on the relationships, the first performance metric from among the group of candidate performance metrics for use in determining an amount of load on a storage system;

determining, by the processor, the amount of load on the storage system based on a value for the first performance metric indicating a performance of the storage system;

determining, by the processor and based on the amount of load on the storage system, a numerical value representing a total number of replicas of content that are to be present in the storage system; and adjusting, by the processor, the storage system to have the total number of replicas of the content.

11. The method of claim 10, further comprising adjusting the storage system to have the total number of replicas by adding a particular number of replicas of the content to the storage system, the particular number of replicas being equal to a difference between a current number of replicas of the content in the storage system and the total number of replicas of the content, the total number of replicas being more than the current number of replicas.

12. The method of claim 10, further comprising:

receiving a write request for updating the content; and in response to receiving the write request:

determining that a first group of replicas of the content in the storage system is to be updated asynchronously;

determining that a second group of replicas of the content in the storage system is to be updated synchronously, the second group of replicas being different from the first group of replicas; and updating the first group of replicas in the storage system asynchronously and the second group of replicas in the storage system synchronously.

13. The method of claim 10, further comprising adjusting the storage system to have the total number of replicas by removing a particular number of replicas of the content from the storage system, the particular number of replicas being equal to a difference between a current number of replicas of the content in the storage system and the total number of replicas of the content, the total number of replicas being less than the current number of replicas.

14. The method of claim 10, wherein the first performance metric includes a load average associated with the storage system, a queue depth associated with the storage system, a tail latency associated with the storage system, or an amount of background activity associated with the storage system.

15. The method of claim 10, further comprising determining the total number of replicas by supplying the amount of load as input to a machine-learning model and receiving the total number of replicas as output from the machine-learning model.

16. The method of claim 15, wherein the machine-learning model is trained using a training dataset comprising input-output pairs, each of the input-output pairs including (i) a respective load amount as input and (ii) a corresponding target number of replicas as output.

17. A non-transitory computer-readable medium comprising program code that is executable by a processor for causing the processor to:
  determine a group of candidate performance metrics;
  determine relationships between the group of candidate performance metrics and storage-system load by performing a regression analysis in which the group of candidate performance metrics serve as independent variables and the storage-system load serves as a dependent variable, wherein the relationships indicate that a first performance metric in the group of candidate performance metrics has a greater influence on the storage-system load than a second performance metric in the group of candidate performance metrics;
  select, based on the relationships, the first performance metric from among the group of candidate performance metrics for use in determining an amount of load on the storage system;
  determine the amount of load on the storage system based on a value for the first performance metric indicating a performance of the storage system;
  determine, based on the amount of load on the storage system, a numerical value representing a total number of replicas of content that are to be present in the storage system; and
  adjust the storage system to have the total number of replicas of the content.

18. The non-transitory computer-readable medium of claim 17, further comprising program code that is executable by the processor for causing the processor to:
  receive a write request for updating the content;
  in response to receiving the write request:
    determine that a group of replicas of the content in the storage system is to be updated asynchronously based on the amount of load on the storage system; and
    update the group of replicas in the storage system asynchronously.

19. The non-transitory computer-readable medium of claim 18, wherein the group of replicas is a first group of replicas, and further comprising program code that is executable by the processor for causing the processor to, in response to receiving the write request:
  determine that a second group of replicas of the content in the storage system is to be updated synchronously based on the amount of load on the storage system, the second group of replicas being different from the first group of replicas; and
  update the second group of replicas in the storage system synchronously.

20. The non-transitory computer-readable medium of claim 17, further comprising program code that is executable by the processor for causing the processor to determine the total number of replicas by supplying the amount of load as input to a machine-learning model and receiving the total number of replicas as output from the machine-learning model.

* * * * *